United States Patent
Oxenham et al.

(10) Patent No.: US 11,068,804 B2
(45) Date of Patent: Jul. 20, 2021

(54) USER PREFERRED VENUE SEATING

(71) Applicant: STUBHUB, INC., San Francisco, CA (US)

(72) Inventors: Oliver Oxenham, Singapore (SG); Wesley Oxenham, Singapore (SG)

(73) Assignee: StubHub, Inc., San Francisco, CA (US)

(*) Notice: Subject to any disclaimer, the term of this patent is extended or adjusted under 35 U.S.C. 154(b) by 835 days.

(21) Appl. No.: 15/287,540

(22) Filed: Oct. 6, 2016

(65) Prior Publication Data

US 2017/0024666 A1    Jan. 26, 2017

Related U.S. Application Data

(63) Continuation of application No. 13/547,456, filed on Jul. 12, 2012, now abandoned.

(51) Int. Cl.
  *G06Q 10/00* (2012.01)
  *G06Q 10/02* (2012.01)
  *G01C 21/34* (2006.01)

(52) U.S. Cl.
  CPC .......... *G06Q 10/02* (2013.01); *G01C 21/3423* (2013.01)

(58) Field of Classification Search
  None
  See application file for complete search history.

(56) References Cited

U.S. PATENT DOCUMENTS

| | | | | |
|---|---|---|---|---|
| 2002/0168084 A1* | 11/2002 | Trajkovic | ............... | G06Q 30/02 |
| | | | | 382/100 |
| 2003/0069763 A1* | 4/2003 | Gathman | ............... | G06Q 30/02 |
| | | | | 705/5 |
| 2006/0106809 A1 | 5/2006 | Faltings et al. | | |
| 2007/0055554 A1 | 3/2007 | Sussman et al. | | |
| 2008/0167806 A1* | 7/2008 | Wheeler | ............... | G01C 21/26 |
| | | | | 701/532 |
| 2009/0216571 A1 | 8/2009 | Sunshine et al. | | |
| 2009/0325606 A1* | 12/2009 | Farris | ...................... | H04L 67/16 |
| | | | | 455/456.3 |
| 2010/0080163 A1* | 4/2010 | Krishnamoorthi | .... | H04L 12/189 |
| | | | | 370/312 |
| 2010/0198498 A1* | 8/2010 | Jansen | ................... | G01C 21/26 |
| | | | | 701/533 |
| 2010/0267399 A1* | 10/2010 | Sweeney | ................ | G06Q 10/10 |
| | | | | 455/456.3 |
| 2011/0178827 A1 | 7/2011 | Orenstein | | |

(Continued)

OTHER PUBLICATIONS

Non-Final Office Action received for U.S. Appl. No. 13/547,456, dated Jul. 30, 2013, 12 pgs.

(Continued)

*Primary Examiner* — Tonya Joseph
(74) *Attorney, Agent, or Firm* — McDermott Will & Emery LLP

(57) ABSTRACT

Methods and systems are provided for allowing a user to more easily select seats that are desirable to the user at event venues. Seating preferences of the user can be provided by the user or can be determined from historic user ticket purchase information. A ticket server can present the user with a map that shows those seating areas that meet at least some of the user's preferences. The user can use the map to determine which seats the user would like to purchase.

19 Claims, 6 Drawing Sheets

(56) References Cited

U.S. PATENT DOCUMENTS

| | | | |
|---|---|---|---|
| 2011/0282700 A1* | 11/2011 | Cockcroft | G06Q 10/02 705/5 |
| 2012/0010912 A1 | 1/2012 | Lele et al. | |
| 2012/0036444 A1* | 2/2012 | Andersen | G06Q 30/00 715/738 |
| 2013/0124234 A1 | 5/2013 | Nilsson et al. | |
| 2013/0185103 A1* | 7/2013 | Sunshine | G06Q 10/04 705/5 |
| 2014/0019172 A1 | 1/2014 | Oxenham et al. | |

OTHER PUBLICATIONS

Response to Non-Final Office Action filed Oct. 29, 2013, for U.S. Appl. No. 13/547,456, 9 pgs.

Final Office Action received for U.S. Appl. No. 13/547,456, dated Nov. 6, 2013, 14 pgs.

Response to Final Office Action filed Feb. 6, 2014, for U.S. Appl. No. 13/547,456, 10 pgs.

Non-Final Office Action received for U.S. Appl. No. 13/547,456, dated Mar. 19, 2014, 14 pgs.

Response to Non-Final Office Action filed Jun. 18, 2014, for U.S. Appl. No. 13/547,456, 9 pgs.

Final Office Action received for U.S. Appl. No. 13/547,456, dated Oct. 23, 2014, 13 pgs.

Response to Final Office Action filed Jan. 20, 2015, for U.S. Appl. No. 13/547,456, 10 pgs.

Non-Final Office Action received for U.S. Appl. No. 13/547,456, dated Mar. 27, 2015, 5 pgs.

Response to Non-Final Office Action filed Jun. 29, 2015, for U.S. Appl. No. 13/547,456, 16 pgs.

Final Office Action received for U.S. Appl. No. 13/547,456, dated Sep. 2, 2015, 7 pgs.

Response to Final Office Action filed Dec. 2, 2015, for U.S. Appl. No. 13/547,456, 12 pgs.

Non-Final Office Action received for U.S. Appl. No. 13/547,456, dated Mar. 10, 2016, 8 pgs.

Response to Non-Final Office Action filed Jun. 10, 2016, for U.S. Appl. No. 13/547,456, 14 pgs.

Final Office Action received for U.S. Appl. No. 13/547,456, dated Jul. 14, 2016, 9 pgs.

* cited by examiner

USER PREFERRED VENUE SEATING

CROSS-REFERENCE TO RELATED APPLICATION

This application is a continuation of U.S. patent application Ser. No. 13/547,456, filed Jul. 12, 2012, which is hereby incorporated by reference in its entirety.

BACKGROUND

Technical Field

The present disclosure generally relates to electronic commerce and, more particularly, relates to the use of a venue seat map or the like that indicates user preferred seating to help the user select seats when purchasing event tickets, such as for concerts and sporting events.

Related Art

The online purchasing of tickets for various events is common. For example, tickets for concerts and sporting events can be purchased from an online ticket seller, such as StubHub, Inc. The tickets can be paid for via a payment provider account, such as that offered by Paypal, Inc. After being paid for, the purchased tickets can then be mailed to the customer or can sometimes be printed by the customer.

Typically, a customer must select one or more seats when purchasing such tickets. Whether the tickets are being purchased online or from a brick and mortar merchant, a venue map is generally provided to help the customer select the seats. The venue map usually shows the different seating areas and their relationship to an attraction area, such as a stage, game court, or field. Ticket prices for each seating area are provided, either on the map or elsewhere. Thus, a customer can use the venue map to help determine which seats the customer would like to purchase for a particular event.

For example, a more dedicated football fan may be willing to pay more for seats closer to the field than a less dedicated football fan. Further, the venue map can help a customer decide what part of the field the customer wants to be near. The more dedicated football fan may prefer to be close to center field.

DETAILED DESCRIPTION

Figure 1:
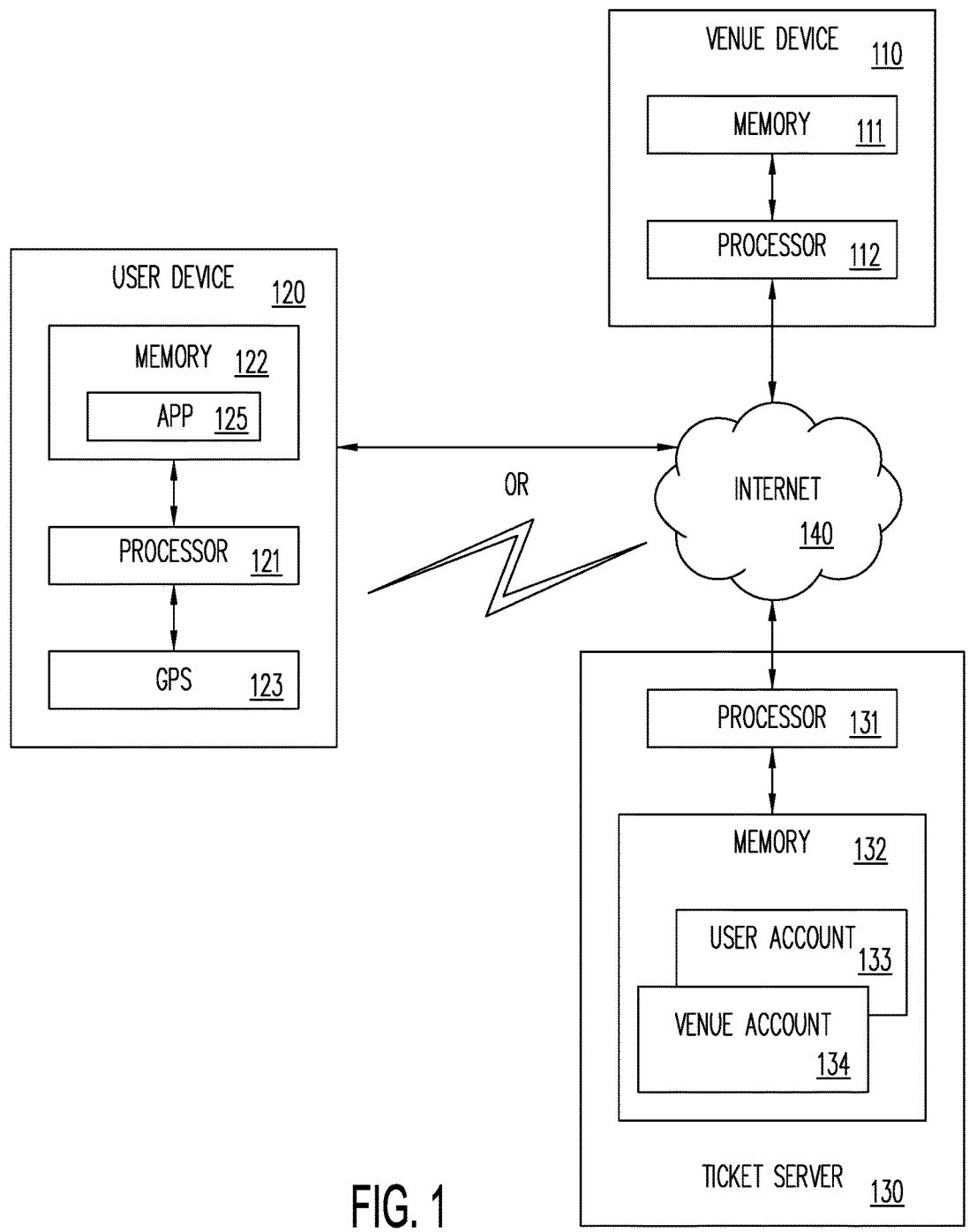
FIG. 1 is a block diagram of a system for providing user preferred venue seating, according to an embodiment.

Methods and systems are provided for allowing a user to more easily select seats that are desirable to the user at event venues. According to an embodiment, the user can select a venue for which the user wants to purchase event tickets. Seating preferences of the user can have been pre-stored, such as with a ticket server. The ticket server can present the user with a map that shows those seats or seating areas that meet or are consistent at least some of the user's preferences. The user can use the map to determine which seats the user would like to purchase.

According to an embodiment, a system can comprise a memory configured to store information regarding a plurality of venues. The information can include at least one user preference for at least one of the venues. One or more processors can be operable to receive a communication including an indication of a desire of a user to purchase tickets for an event at a selected one of the venues. The processor(s) can determine, via the memory, at least one user preference for the selected one of the venues. The processor(s) can send to the user information regarding an availability of seats consistent with the at least one user preference.

According to an embodiment, at least one of the user preferences can be provided to the system by the user. The user can provide the preference(s) to the system during a user preference set up procedure, for example. The user can provide the preference(s) to the system when purchasing tickets. The use of such preferences by the system to provide the user with seats can be on a one time basis or can be for use with a plurality of ticket purchases by the user.

According to an embodiment, at least one of the user preferences can be determined by the system based upon user seating history. The system can use a purchase history of the user at the venue for which tickets are currently being purchased to determine or infer user preferences. The system can use a purchase history of the user at different venue from the venue for which tickets are currently being purchased to determine or infer user preferences. The system can use a purchase history of the user from a plurality of venues for which tickets have previously been purchased to determine or infer user preferences.

According to an embodiment, the user preference(s) can comprise seating criteria preferences for the selected one of the venues. The user preference(s) can include distance from an attraction area (such as a stage, arena, court or field), an ability to see an attraction area, an ability to see a specified part of the attraction area, an include ability to see the entire attraction area, an ability to hear sound from the attraction area, and/or a type of the seat (hard, padded, folding, box, etc.). The user preference(s) can include any criteria that the user can use to decide which seats for the user would like to purchase tickets.

The user preference(s) can include a distance from another person. For example, the user can prefer to select seats based on where the user's friends are seated. The user can prefer to sit next to or within a given distance from friends, family, co-workers, and the like. Thus, the user can select seats next to one or more friends.

According to an embodiment, the user preferences can include seating area preferences for the selected venue. The user preferences can include specific seats for the selected venue. The user preferences can include both seating area preferences for the selected venue and specific seats for the selected venue. For example, the user preference can be for specific seats, but can be for the seating area of the specific seats if the specific seats are not available.

According to an embodiment, the user preference(s) can be negative preferences. Negative preferences can be preferences that something not be true. For example, a negative preference can be a preference that the user not sit near a food stand, beverage stand, or restroom.

According to an embodiment, the user preferences can include seating preferences for the plurality of venues generally. The user preferences can include seating criteria preferences for the plurality of venues generally.

According to an embodiment, the processor(s) can determine, via the memory, one user preference for the selected one of the venues and the processors can send to the user information regarding an availability of seats consistent with the one user preference. Alternatively, the processor(s) can determine, via the memory, a plurality of user preferences for the selected one of the venues and the processors can send to the user information regarding an availability of seats consistent with the one plurality of user preferences, As yet a further alternative, the processor(s) can determine, via the memory, all of the user preferences for the selected one of the venues and the processor(s) can send to the user information regarding an availability of seats consistent with all of the user preferences.

According to an embodiment, the processor(s) can send to the user a map showing an availability of seats consistent with the one user preference. Alternatively, the processor(s) can send to the user a map showing an availability of seats consistent with a plurality of the user preferences. As yet a further alternative, the processor(s) can send to the user a map showing an availability of seats consistent with all of the user preferences.

The map can use color coding to indication which seats are more consistent with the user preferences. For example, one color can indicate that a seat is consistent with one of the user preferences, another color can indicate that a seat is consistent with two of the user preferences, and yet another color can indicate that a seat is consistent with all of the user preferences. Thus, the color can depend upon how many of the user preferences are meet.

According to an embodiment, a method can include storing, in a memory, information regarding a plurality of venues, including at least one user preference for at least one of the venues. A communication can be received via the one or more processors and the communication can include an indication of a desire of a user to purchase tickets for an event at a selected one of the venues. At least one user preference for the selected one of the venues can be determined via the one or more processors. Information regarding an availability of seats consistent with the at least one user preference can be sent to the user via the one or more processors.

A seat can be considered to be consistent with a preference if the seat meets the preference. For example, if the preference is to be within 50 feet of the stage, then all seats within 50 feet of the stage are consistent with this preference. If a seat cannot be found that is consistent with a particular preference, then the ticket server 130 can present the user with seats that come as close to being consistent with that preference as possible. For example, if the preference is to be within 50 feet of the stage, but the closest available seats are 65 feet from the stage, then the seats 65 feet from the stage can be presented to the user with the information that these are the closest available seats.

According to an embodiment, the user can be presented with a map showing availability of seats with different visual indicators based on a determined desirability of a seat for the user. The different determined desirabilities can be shown with different visual indicators. For example, the visual indicators can comprise size, brightness, and/or colors. As further examples, the visual indicators can be different colors, patterns, icons, numbers, text, or graphics.

According to an embodiment, computer readable and executable code for instructing the processor(s) to perform the method can be recorded on a non-transitory computer readable medium. For example, the method can be recorded on a hard drive, a solid state drive, magnetic tape, or optical storage media. The method can be recorded on any desired type of non-transitory computer readable medium.

FIG. 1 is a block diagram showing a venue seat and feature map system, according to an embodiment. A venue device 110 can be present at each of a plurality of different event venues. The venue device 110 can provide information regarding events scheduled to be at the venue, regarding seating at the venue, and regarding features of the venue. The venue device 110 can provide such information to a ticker server 130. The ticket server 130 can obtain information regarding events scheduled to be at various venues, information regarding seating, and information regarding features of the various venues from other sources.

The venue device 110 can be a computer, a server, a computing tablet, or a mobile device, for example. The venue device 110 can have a processor 111 and a memory 112. The processor 110 can execute a software program stored in the memory 112 for providing information regarding events scheduled to be at the venue, regarding seating, and regarding features of the venue. The venue device 110 can provide such information to the ticket server and/or to a user device 120.

The venue device 110 can be disposed at the venue. The venue device 110 can be disposed at a location other than the venue. Each venue can have a dedicated venue device 110. A plurality of different venues can share a common venue device 110. For example, co-owned venues can share a common venue device 110.

The user can have the user device 120. The user device 120 can be a mobile device such as a cellular telephone, a tablet computer, a laptop computer, or the like. The user device 120 can be a non-mobile device such as a home (land line) telephone, a table top computer, an interactive set top box, or the like. The user device 120 can be any device or combination of devices that facilitate online ticket purchasing.

The user device 120 can have a processor 121, a memory 122, and a global positioning system (GPS) 123. The processor 121 can execute an application or app 125 that facilitates the venue seat and feature map method disclosed herein. The app 125 can be stored in the memory 122. The app 125 can provide a graphical user interface (GUI) for the user when purchasing tickets online. The app 125 can be a dedicated ticket purchasing app. The app 125 can be part of another app, such as a Paypal payment provider app.

The user device 120 can communicate with the venue device 110 and/or the ticket server 130 via a network. For example, the user device 120 can communicate with the venue device 110 and/or the ticket server 130 via the Internet 140. The user device 120 can communicate with the Internet via either a wired connection or a wireless connection.

An online ticket seller, such as StubHub, Inc. can have the ticket server 130. The ticket server 130 can facilitate online ticket sells. The ticket server 130 can have a processor 131 in communication with a memory 132. The processor 131 can be one or more processors. The processor 131 can access a user account 133 and a venue account 134 that are stored in the memory 132. The user account 133 can include information regarding the user, e.g., identification information, preferences, account numbers, and purchase history. The venue account 134 can include information regarding the venue, e.g., information regarding events, seating, and features, The memory 132 can be separate from the ticker server and can have any number of user accounts 133 and venue accounts 134. The memory 132 can be distributed, e.g., have portions thereof disposed at a plurality of different locations.

The ticket 130 server can be one or more servers located at one or more locations. Thus, the ticket server 130 can be geographically and operationally distributed. The ticker server 130 can be part of another system, such as a payment provider system.

The venue device 110 can communicate with the ticket server 130, such as via a network. For example, the venue device 110 can communicate with the ticket server 130 via the Internet 140. The venue device 110 can communicate with a plurality of different the payment servers 130. The ticket server 130 can communicate with a plurality of different the venue devices 110. A plurality of different ticket servers 130 can communicate among themselves and can be considered herein as being the same as a single ticket server 130. The user can utilize the user device 120 to interact with the ticket server 130 so that the user can purchase tickets online.

The ticket server 130 can communicate with the venue device 110 to obtain information regarding the venue. For example, the ticket server 130 can communicate with the venue device 110 to obtain information regarding the scheduling of events at the venue and regarding features of the venue. The features of the venue can be dependent upon the events of the venue, e.g., the features of the venue can vary from event to event.

FIGS. 2A-3B are flow charts that describe examples of operations of the venue seat and feature map system according to embodiments thereof. Note that one or more the steps described herein may be combined, omitted, or performed in a different order, as desired or appropriate.

Figure 2A:
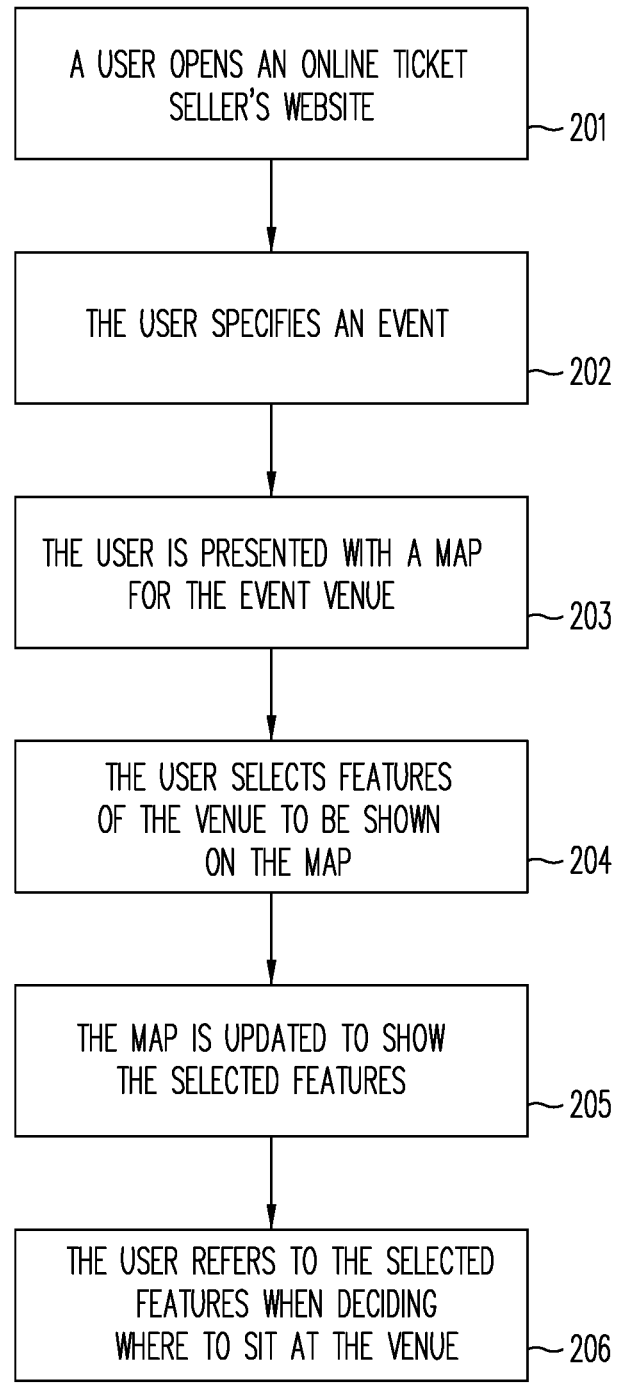
FIGS. 2A and 2B are flow charts showing a method for providing user preferred venue seating, according to an embodiment.

FIG. 2A is a flow chart showing a method for providing the venue seat and feature map, according to an embodiment. A user who wants to purchase one or more tickets for an event can open an online ticket seller's website, as shown in step 201. The user can open the ticket seller's website using the user device 120, for example. The ticket seller's website can be hosted on the ticket server 130, the venue device 110, or on any other server or device.

The user can specify an event, as shown in step 202. The event can be a concert, sporting event, or any other type of event for which tickets are sold. The event can be specified by stating a name of the event, a venue, and/or a date. For example, the event of Metallica concert at Pacific Amphitheatre on Jun. 6, 2012 can be specified by entering "Metallica", "Pacific Amphitheatre" and/or "Jun. 6, 2012" in one or more entry boxes of the web site.

If the information entered is insufficient to uniquely identify the event, then the web site can present the user with a list of possible events, For example, if the user only entered "Metallica" without stating a date or venue, then a list of upcoming Metallic concerts (tour dates) can be presented for the user to choose from. In this way, the user can quickly find the event for which tickets are desired.

The user device 120 can provide GPS location information to the ticket server 130 and the ticket server 130 can be configured to limit the venues to one or more venues that are close to the location of the user device 120 when the user is attempting to specify the event. For example, if the user merely enters the word "Metallica" to identify an upcoming event and the GPS 123 of the user device 120 indicates that the user is in Los Angeles, then the ticket server 130 can present the user with the closest Los Angeles venue or all of the venues in Los Angeles.

The user can optionally be presented with only the next relevant event in the user's area. For example, if the user merely enters the word "Metallica" to identify the upcoming event, then the user can be presented with only the next Metallica concert at the closest venue to the user. The user can then be requested to verify that the desired event is being presented.

After the event has been uniquely identified, the user can be presented with a map for the event venue, as shown in step 203. The map can be shown on the web site. The map can show the different seating areas and their relationship to the attraction area, e.g., the stage, game court, or field. The map can be printed by the user, if desired. The ticket prices for each seating area can be provided.

The map can also show at least one venue feature. For example, the map can show escalators, elevators, wheel chair accesses, restaurants, drink stands, playgrounds, stores, parking lots, restrooms, and the like. The map can also show any desired features or combination of desired features.

The map can show a best route from a selected seat to a feature. For example, the map can show a best route from a selected seat to a parking area that is designated for use by the ticket holder for that seat. As a further example, the map can show a best route from a selected seat to the nearest restroom. The best route can be defined as the shortest route.

The best route can be defined by the user according to any desired user criteria. For example, the map can show a best route for a party that includes a person in a wheelchair. Such a best route can take advantage of elevators and wheel chair ramps. As a further example, the map can show a best route that passes by a restroom.

The map can show a best route from a selected seat to an alternate feature. For example, if the user knows that the lines are likely to be long at the closest restroom, then the user can have the best route to the next nearest restroom shown on the map.

The map can show alternate routes from a selected seat to a feature. For example, if the user knows that the shortest route to a drink stand is likely to be congested, then the user can have an alternate route, e.g., the next shortest route, to the same drink stand displayed.

The best route can be determined by the ticket server 130 and can be communicated to the user device 120. Alternatively, the best route can be determined by the user device 120. As a further alternative, the best route can be determined by the venue device 110. The best route can be determined by any desired device according to any desired criteria.

The user device 120 can be a mobile device and the map, as well as any or all of the features, can be stored on the user device 120. For example, the map can be used during the event to determine the location of a feature, the location of an alternative feature (such as the next closest restroom when the closest restroom is full), the best route to a feature, or the next best route to a feature.

The user can mark locations on the map, as desired. For example, the user can mark, high light, or drop a pin on the location of a friend's seat elsewhere in the venue. The user can mark any desired location on the map. The user can mark locations on the map for any desired purpose. For example, the user can mark locations on the map to show were features are located or to define the starting points and ending points of routes.

GPS or another location service or combination of services can provide instructions to the user for finding features or for following routes. For example, the app 125 of the user device 120 can provide verbal instructions, such as via earphone, for the user to follow such that the user does not need to view the map as the user moves about the venue. In this manner, the user can often view the event rather than look at the user device 102.

The map can show best routes or alternate routes from one feature to another feature. The map can show best routes or alternate routes from any place at the venue to any other place at the venue. The user can designate a starting point and an ending point for any such routes, such as by dropping pins on the map as displayed on the user device 120.

The user device 120 can be a mobile device and the map can be updated in real time. Thus, the map can be used in real-time to determine which feature to visit and can be used in real time to determine the best or an alternate route to the feature. Which feature to visit can be determined by taking into consideration factors such as brand preference (e.g., Coca Cola vs. Pepsi) and waiting lines. Brand preferences can be entered by the user during a setup process. The map can be updated in real time to show the status of features. For example, if a drink stand closes or runs out of inventory, a note can be provided on the map.

The map can be interactive. For example, in response to the user making a change on the map, such as adding or deleting a feature, the app 125 or the ticket server 130 can suggest one or more other changes. For example, if the user deletes a beer concession, the app 125 or the ticket server can suggest a nearby soft drink concession to be added.

The system can be anticipatory. For example, in response to the user adding a beer concession to the map, the app 125 or the ticket server 130 can suggest that a nearby restroom also be added. Thus, the system can determine future needs of the map based upon current use of the map.

The best route to a selected one of the features can be determined by taking into consideration such factors as distance to the feature and foot traffic congestion (as reported by human operators and/or machine vision). Any preferences regarding routing can also be considered. For example, the user can specify that all routes be less than a predetermined distance. The user might want to specify short routes of the user is disabled, unable to walk longer distances, or simply prefers to walk shorter distances.

The app 125 can use the GPS 123 and the clock of the user device 120 to determine that the user is at the venue. Prior to the event, the app 125 can automatically offer to show the user where to park, how to get to the seats, and where features such as the nearest concession stands and restrooms are, for example. After the event, the app 125 can offer to show the user the route to the parking lot, the nearest freeway, a destination (such as the user's home), or any other place.

The map can be a photographic map or virtual map. The map can thus show the actual features or a simulation of the actual features. The photographic may can be updated, such as in real time. The virtual map can be photorealistic.

The user can specify which venue features are to be shown on the map, as shown in step 204. The user can specify which venue features are to be shown on the map prior to the map being displayed on the web site. For example, the user can specify which venue features are to be shown on the map via the use of a menu, such as a drop down menu of the app 125.

The user can specify which venue features are to be shown after the map is displayed by the web site. For example, the user can specify which venue features are to be shown on the map via the use of a drop down menu that is provided on the map or along with the map. The venue features can be specified iteratively. That is, the venue features can be changed repeatedly until the user is satisfied with the features displayed.

The map can be update to show the selected features, as shown in step 205. Thus, each time that the user changes the features that are selected to be shown on the map, the map can be updated to shown the newly selected features. Such updating can be facilitated via communication between the user device 120 (from which the features can be selected) and the ticket server 130 (which can add the features to the map of the website displayed on the user device 120.

Alternatively, the ticket server 130 can download the map and all of the features to the user device 120 and the map can be changed by the user device 120 without requiring the continued cooperation of the ticket server 130. For example, an app 125 executed in the user device, a Java applet, or the like can facilitate changing of the features shown on the map without involvement of the ticket server 130. In this manner, network traffic can be minimized, bandwidth efficiency can be enhances, and the bandwidth requirements of the device 120 and/or the app 125 can be reduced.

The user can refer to the selected features when deciding where to sit at the venue, as shown in step 206. Thus, the user can display the features that are important to the user for deciding where to sit at a venue. The user can then determine which seats are close enough to those features to be desirable to the user and can select the seats on this basis. For example, if the user is going to bring children to the event, then the user may want to select seats near a playground. As a further example, if the user intends to eat during the event, the user may want to be near a restaurant, possible a particular restaurant such as a hotdog stand or pizza shop.

The user can specify that selected features be shown on the map only when grouped with a specified distance of one another. For example, the user can specify that the drink stands and restrooms be shown on the map only when the drink stands are within fifty feet of the restrooms.

Features such as restaurants and drink stands can be identified generically on the map. For example, the words "Restaurant" and "Drink Stand" can simply be used to indicate these features on the map. Alternatively, more descriptive terms can be used. For example, a name of the restaurant or a name of the products being sold can be shown on the map. For example, the words "Burger King Restaurant" or "Coca Cola Drink Stand" can be used. Any words, logos, designs, icons, or the like which indicate to the user what is at a location on the map can be used.

The user can choose to color code the features. For example, all food concessions can be color coded red, all drink concessions can be color coded blue, and all restrooms can be color coded green. Such color coding can help the user to quickly locate the desired feature, especially when the map is being displayed on the comparatively small screen of a mobile user device 120.

The user can define words, logos, designs, icons, or the like to be displayed upon the map for the features. Thus, the user can select such words, logos, designs, icons, or the like from words, logos, designs, icons, or the like presented by the website and/or can custom design words, logos, designs, icons, or the like for presentation on the map. For example, the user can select a Pepsi bottle from a list of graphic images to be used for all drink stands and can type the word "EATS" to be used for all restaurants. In this manner, the user can customize the maps, thus potentially making the event more appealing to the user and thereby increasing ticket sells for the online ticket seller.

The user can pre-define what features are to be shown on the map, such as during a setup process. This pre-definition of features to be shown on the map can then apply to all subsequently displayed maps. For example, the user can select restrooms and beer stands to be displayed on all future maps. Thus, any maps displayed by the venue seat and feature map in the future will automatically show the restrooms and beer stands in addition to the seating areas and attraction area.

The user can pre-define a plurality of different feature groups, such as during a setup process, Each feature group can contain a different set of features that are to be used for a different type of event. This, the user can pre-define one feature group for rock concerts and another feature group for monster truck rallies. For example, the user can pre-define one feature group containing drink stands and restrooms for the rock concerts and can pre-define another feature group containing playgrounds and souvenir shops for the monster truck rallies.

The venue seat and feature map system can automatically apply the pre-defined group for the user. Thus, when a map for a rock concert is being displayed, then the venue seat and feature map system can automatically apply the pre-defined group for rock concerts to the map. The user can then change which pre-defined group is to be use, if the user desires to do so. Alternatively, the user can select which pre-defined group is to be shown prior to the map being displayed.

This pre-definition of features to be shown on the map can then apply to all subsequently displayed maps. For example, the user can select restrooms and beer stands to be displayed on all future maps. Thus, any maps displayed by the venue seat and feature map in the future will automatically show the restrooms and beer stands in addition to the seating areas and attraction area.

Any such customization or pre-definition of features to be shown on a map can last indefinitely or can last for a pre-determined amount of time. Such customization or pre-definition of features to be shown on a map can last for a day, a week month, a season, a year, multiple years, or any other length of time. For example, a season ticket holder may set up a custom map for a baseball team that only applies when that particular baseball team is playing and that defines the features to be shown on the map and the words or graphics to be displayed to indicate each feature. Other custom maps can be user by the season ticket holder for basketball games and football games.

When the map is initially sent to the user, the map can show all of the features available for the event, some of the features available for the event, or none of the features available for the event. The user can subsequently define which of the features available for the event the user desires to see on the map and the map can be changed to show only the desired features.

Figure 2B:
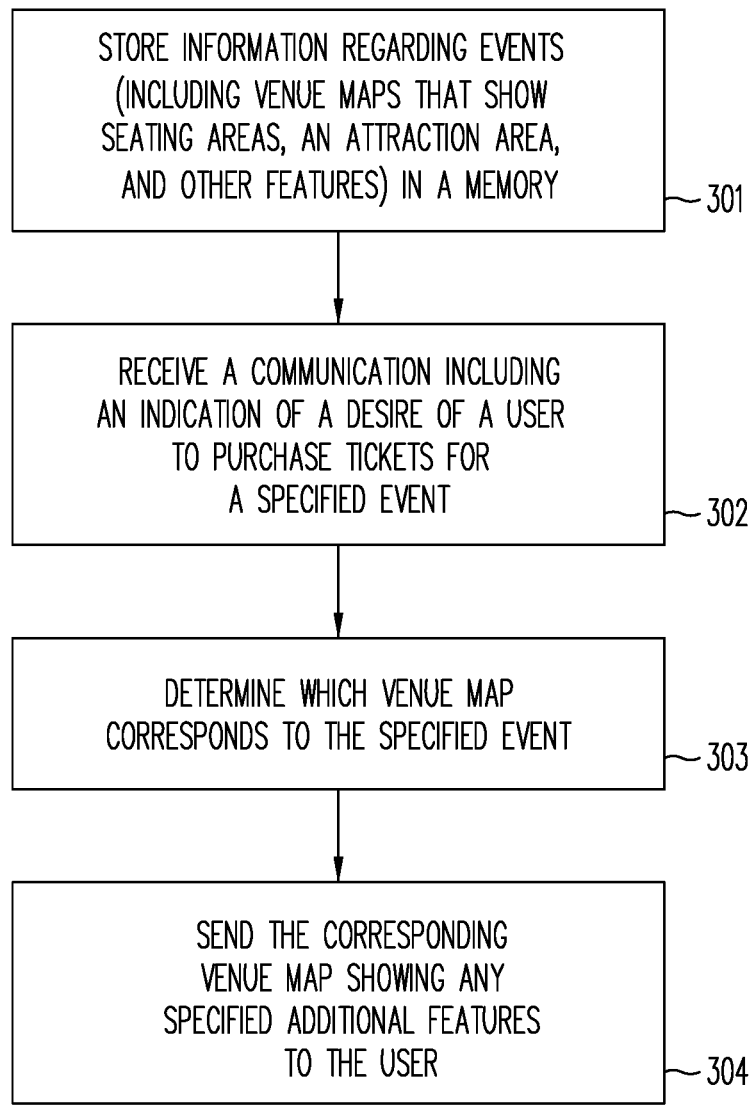

FIG. 2B is a flow chart showing further detail of the method for the venue seat and feature map, according to an embodiment. A ticket server 130 can store information regarding events in a memory 132, as shown in step 301. The information can include venue maps that show seating areas and an attraction area such as a stage, court or field. Information regarding features of the venue can be stored in the memory 132. For example, information regarding the location, routes to, and items sold by stores, drink stands, shops, and the like can be stored in the memory 132. Information regarding which events at the each venue will utilize such features can be stored in the memory 132.

The ticket server 130 can receive a communication that includes an indication of a desire of the user to purchase tickets for a specified event, as shown in step 302. For example, the user can open the app 125 on the user device 120. The app 125 can initiate communication with the ticket server 130. From the app 125, the user can select the event for which the user desires to purchase tickets. Generally, the event will be defined by specifying an attraction, e.g., a performer or a team, a venue, and/or a date.

The user can access a web site of the online ticket seller, with or without using the app 125. The user can select the event for which the user desires to purchase tickets, can specify the features, and can view the map via the web site.

The ticket server 130 can determine which map corresponds to the specified even, as shown in step 303. The ticket server 130 can determine which map corresponds to the specified event via a data base stored in the memory 132, for example. The ticket server 130 can send the map, showing any specified features, to the user as shown in step 304.

Figure 3A:
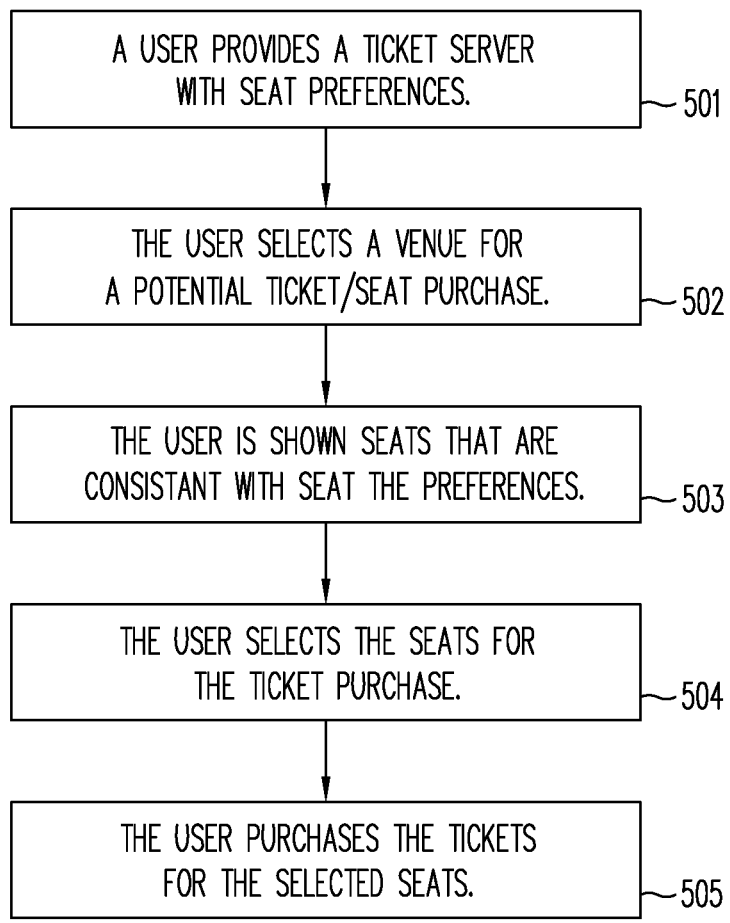
FIGS. 3A and 3B are a flow charts showing further detail of the method for providing user preferred venue seating, according to an embodiment.

FIG. 3A shows a flow chart having additional detail regarding the user preferred venue seating wherein the user provides the ticket server 130 with user seating preferences, according to an embodiment. A user can provide the ticket server 130 with seat preferences, as shown in step 501. For example, the seat preferences can be provided to the ticket server 130 during a seating preferences setup procedure performed by the user, such as when setting up an account with the ticket seller.

The user can select a venue/event for a potential ticket or seat purchase, as shown in step 502. The venue/event selection can be part of a ticket purchase that is performed in cooperation between the user and the ticket seller, such as via the user device 120 and the ticket server 130.

The user can be shown seats that are consistent with the seat preferences provided by the user, as shown in step 503. The seats can be shown to the user by the ticket server 130. The seats can be shown as text, graphics, or any combination of text and graphics. For example, the seats can be shown on a map of the venue with those seats that are consistent with the seat preferences being highlighted.

The user can select the seats for the ticket purchase, as shown in step 504. The user can select the seats by filling out a form, e.g., entering text, or by selecting the seats, e.g., with a cursor or by touching a touch screen.

The user can purchase the tickets, as shown in step 505. The purchase can be done either online or at a brick and mortar ticket outlet. The purchase can be done online by confirming with the ticket server 130 that the user wants to make the purchase.

Figure 3B:
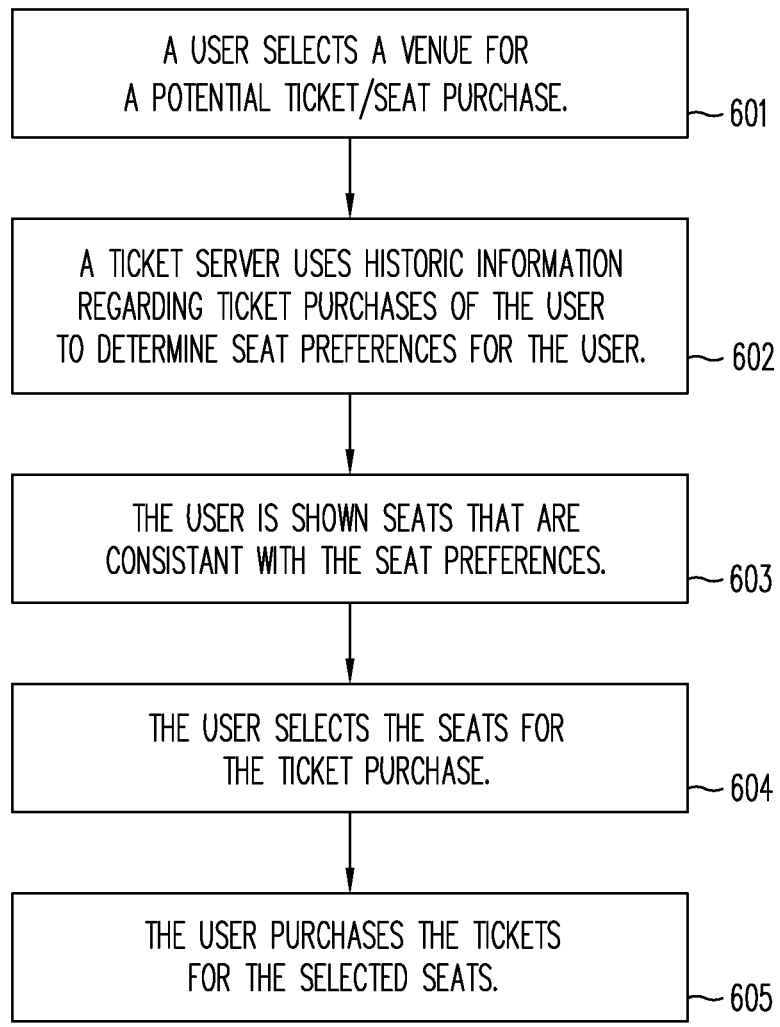

FIG. 3B shows a flow chart having additional detail regarding the user preferred venue seating wherein the ticket server 130 determines user seating preferences from user historic seating information, according to an embodiment. The user can select a venue/event for a potential ticket or seat purchase, as shown in step 601. The venue/event selection can be part of a ticket purchase that is performed in cooperation between the user and the ticket seller, such as via the user device 120 and the ticket server 130.

The ticket server 130 can use historic information regarding ticket purchases of the user to determine seat preferences for the user, as shown in 602. For example, if the user has always selected a particular seating area in the past, this particular area can be considered to be a preferred seating area for the user. Any criteria can be used to determine preferences from historic information.

The user can be shown seats that are consistent with the seat preferences provided by the user, as shown in step 603. The seats can be shown to the user by the ticket server 130.

The seats can be shown as text, graphics, or any combination of text and graphics. For example, the seats can be shown on a map of the venue with those seats that are consistent with the seat preferences being highlighted.

The user can select the seats for the ticket purchase, as shown in step 604. The user can select the seats by filling out a form, e.g., entering text, or by selecting the seats, e.g., with a cursor or by touching a touch screen.

The user can purchase the tickets, as shown in step 605. The purchase can be done either online or at a brick and mortar ticket outlet. The purchase can be done online by confirming with the ticket server 130 that the user wants to make the purchase.

In implementation of the various embodiments, embodiments of the invention may comprise a personal computing device, such as a personal computer, laptop, PDA, cellular phone or other personal computing or communication devices. The online ticket seller may comprise a network computing device, such as a server or a plurality of servers, computers, or processors, combined to define a computer system or network to provide the online ticket sales.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 4:
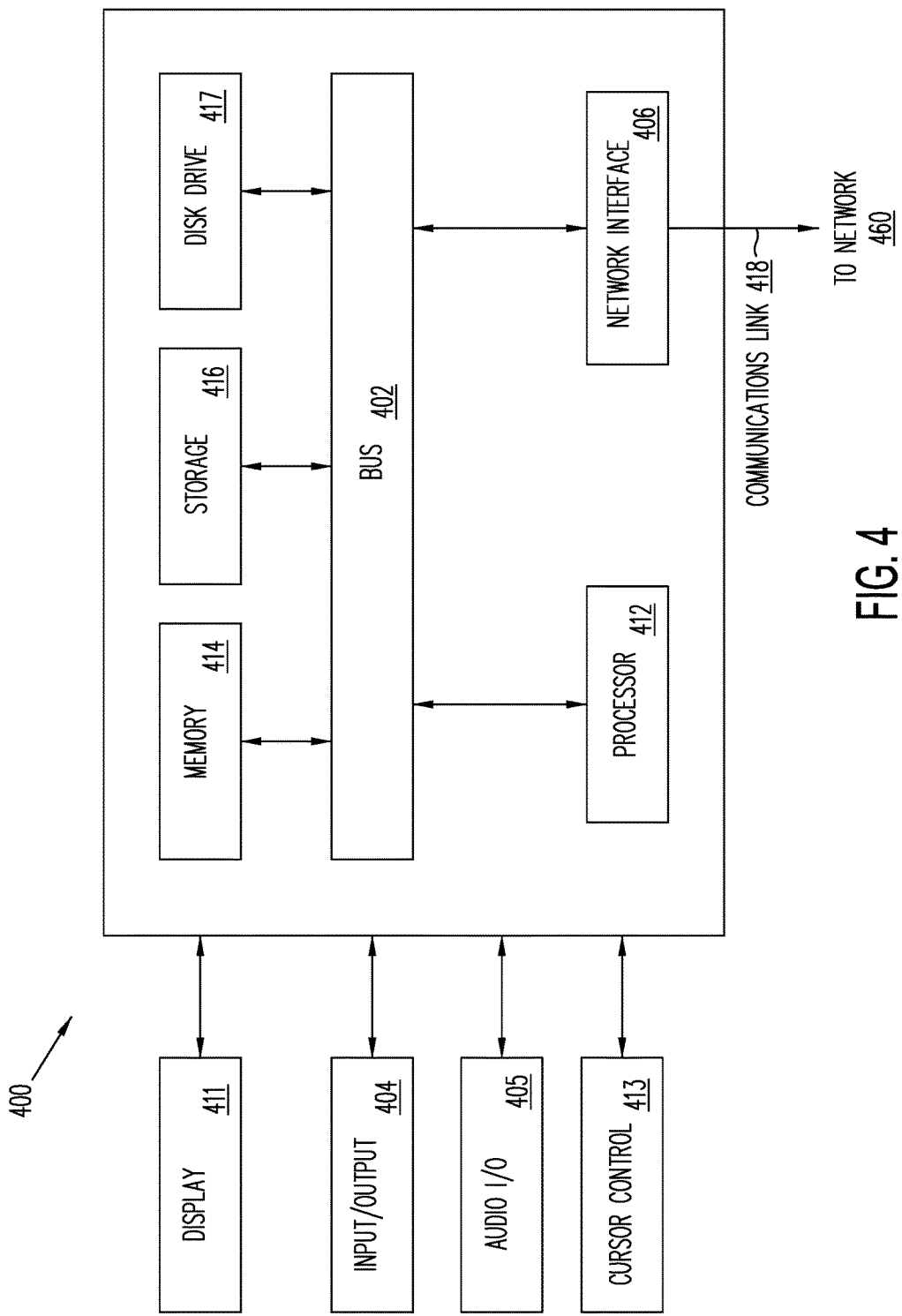
FIG. 4 is a block diagram of an example of a computer that is suitable for use in the system for providing user preferred venue seating, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store or an online store. The store can be any person or entity that sells a product.

As used herein, the term "product" can include any item or service. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "attraction area" can include any area, stage, field, court, or other structure or area when performers, players, or the like perform or play. The term "attraction area" can include any place that the spectators desire to view at the venue.

As used herein, the term "game field/court" can include any field, court, arena, or other structure or area when a game is played.

As used herein, the term "restaurant" can include any restaurant, coffee shop, café, deli, sandwich shop, or any other place that sells food or beverages.

As used herein, the term "drink stand" can include any place where any beverage is sold.

As used herein, the term "playground" can include any place that has toys, swings, slides, or other things for children to play on or with. The term "playground" can be included any place where children are expected to play.

As used herein, the term "store" can include any souvenir shop, gift shop, or other place where a user can shop. As used herein, the term "store" can include any place where products are sold.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system, comprising:
a memory configured to store information regarding user preference information associated with a first user; and
one or more processors coupled to the memory and configured to:
receive, from the first user, a set of user-defined selectable features corresponding to categories of goods, services, or items of interest available to attendees of a plurality of events at a plurality of venues;
after receiving the set of user-defined selectable features, receive, from the first user, a user selection of an event at a venue;
in response to receiving the user selection, determine one or more user preferences of the first user;
present an interactive digital map of the venue on a graphical user interface (GUI) of the user device, the interactive digital map displaying the set of user-defined selectable features and a first visual indicator of one or more available seats, wherein the first visual indicator represents one or more of the one or more determined user preferences satisfied by the one or more available seats;
receive a user selection of a first seat of the one or more available seats; and
access location data determined by a global positioning system (GPS) sensor of the user device to:
automatically present, at a time before the event, a first offer of directions on the GUI of the user device to a location associated with the venue and subsequently present directions to the first seat;
determine a location of the first user at the event;
present a second visual indicator on the GUI of the user device, wherein along with the second visual indicator, the GUI of the user device includes one or more features as selectable features by the first user, wherein the selectable features belong to the set of user-defined selectable features received from the first user prior to the event;
receive a user selection on the GUI of the user device of at least one of the selectable features; and
in response to receiving the user selection of the at least one of the selectable features, present the first user a real-time status update on the GUI of the user device of a route to the at least one of the selectable features from the location of the first user, the route being selected from a plurality of alternative routes according to at least one of the determined user preferences.

2. The system of claim 1, wherein the one or more processors are further configured to:
determine, by accessing ticket purchase history information of the first user, a plurality of seats purchased at one or more respective venues;
determine a user preference based on the plurality of seats; and
associate the user preference with the first user in the memory as a part of the user preference information, wherein the one or more user preferences comprise the user preference.

3. The system of claim 1, wherein the one or more processors are further configured to:
determine a second user associated with the first user has purchased a ticket for the event;
determine a second seat of the second user; and
determine a user preference of being within a distance from the second seat, wherein the one or more user preferences comprise the user preference.

4. The system of claim 1, wherein the one or more processors are further configured to:
receive at least one user preference entered by the first user on the user device, wherein the one or more user preferences comprise the at least one user preference.

5. The system of claim 1, wherein the one or more user preferences comprise one or more seating criteria, the one or more seating criteria comprising a distance from an attraction area, visibility of the attraction area, a type of seat, or a combination thereof.

6. The system of claim 1, wherein each visual indicator comprises a corresponding color, size, brightness, pattern, or a combination thereof.

7. A method, comprising:
receiving, from a first user, a set of user-defined selectable features corresponding to categories of goods, services, or items of interest available to attendees of a plurality of events at a plurality of venues;
after receiving the set of user-defined selectable features, receiving a user selection of an event at a venue;
in response to receiving the user selection, determining one or more user preferences of a first user;
presenting an interactive digital map of the venue on a graphical user interface (GUI)- of the user device, the interactive digital map displaying the set of user-defined selectable features and a first visual indicator of one or more available seats, wherein the first visual indicator represents one or more of the one or more determined user preferences satisfied by the one or more available seats;
receiving a user selection of a first seat of the one or more available seats; and
accessing location data determined by a global positioning system (GPS) sensor of the user device to:
automatically presenting, at a time before the event, a first offer of directions on the GUI of the user device to a location associated with the venue and subsequently present directions to the first seat;
determining a location of the first user at the event;
presenting a second visual indicator on the GUI of the user device, wherein the second visual indicator indicates one or more features as selectable features by the first user, wherein the selectable features belong to the set of user-defined selectable features received from the first user prior to the event;
receiving a user selection on the GUI of the user device of at least one of the selectable features; and
in response to receiving the user selection of the at least one of the selectable features, presenting the first user a real-time status update on the GUI of the user device of a route to the at least one of the selectable features, the route being selected from a plurality of alternative routes according to at least one of the determined user preferences.

8. The method of claim 7, further comprising:
determining, by accessing ticket purchase history information of the first user, a plurality of seats purchased at one or more respective venues; and
determining a user preference based on the plurality of seats, wherein the one or more user preferences comprise the user preference.

9. The method of claim 7, further comprising:
determining a second user associated with the first user has purchased a ticket for the event;
determining a second seat of the second user; and
determining a user preference of being within a distance from the second seat, wherein the one or more preferences comprise the user preference.

10. The method of claim 7, further comprising:
receiving at least one user preference entered by the first user on the user device, wherein the one or more user preferences comprise the at least one user preference.

11. The method of claim 7, wherein the one or more user preferences comprise one or more seating criteria, the one or more seating criteria comprising a distance from an attraction area, visibility of the attraction area, a type of seat, or a combination thereof.

12. The method of claim 7, wherein each visual indicator comprises a corresponding color, size, brightness, pattern, or a combination thereof.

13. A non-transitory machine-readable medium having stored thereon machine-readable instructions executable to cause a machine to perform operations comprising:
receiving, from a first user, a set of user-defined selectable features corresponding to categories of goods, services, or items of interest available to attendees of a plurality of events at a plurality of venues;
after receiving the set of user-defined selectable features, receiving a user selection of an event at a venue;
in response to receiving the user selection, determining one or more user preferences of a first user;
presenting an interactive digital map of the venue on a graphical user interface (GUI)- of the user device, the interactive digital map displaying the set of user-defined selectable features and a first visual indicator of one or more available seats, wherein the first visual indicator represents one or more of the one or more determined user preferences satisfied by the one or more available seats;
receiving a user selection of a first seat of the one or more available seats; and
accessing location data determined by a global positioning system (GPS) sensor of the user device to:
automatically presenting, at a time before the event, a first offer of directions on the GUI of the user device to a location associated with the venue and subsequently present directions to the first seat;
determining a location of the first user at the event;
presenting a second visual indicator on the GUI of the user device, wherein the second visual indicator indicates one or more features as selectable features by the first user, wherein the selectable features belong to the set of user-defined selectable features received from the first user prior to the event;
receiving a user selection on the GUI of the user device of at least one of the selectable features; and
in response to receiving the user selection of the at least one of the selectable features, presenting the first user a real-time status update on the GUI of the user device of a route to the at least one of the selectable features, the route being selected from a plurality of alternative routes according to at least one of the determined user preferences.

14. The non-transitory machine-readable medium of claim 13, wherein the operations further comprise:
determining, by accessing ticket purchase history information of the first user, a plurality of seats purchased at one or more respective venues; and
determining a user preference based on the plurality of seats, wherein the one or more user preferences comprise the user preference.

15. The non-transitory machine-readable medium of claim 13, wherein the operations further comprise:
   determining a second user associated with the first user has purchased a ticket for the event;
   determining a second seat of the second user; and
   determining a user preference of being within a distance from the second seat, wherein the one or more preferences comprise the user preference.

16. The non-transitory machine-readable medium of claim 13, wherein the operations further comprise:
   receiving at least one user preference entered by the first user on the user device, wherein the one or more user preferences comprise the at least one user preference.

17. The non-transitory machine-readable medium of claim 13, wherein the one or more user preferences comprise one or more seating criteria, the one or more seating criteria comprising a distance from an attraction area, visibility of the attraction area, a type of seat, or a combination thereof.

18. The non-transitory machine-readable medium of claim 13, wherein each visual indicator comprises a corresponding color, size, brightness, pattern, or a combination thereof.

19. The system of claim 1, wherein the interactive digital map may be a photorealistic map, a photographic map, a virtual map, or a combination thereof.

* * * * *

UNITED STATES PATENT AND TRADEMARK OFFICE
CERTIFICATE OF CORRECTION

PATENT NO. : 11,068,804 B2
APPLICATION NO. : 15/287540
DATED : July 20, 2021
INVENTOR(S) : Oliver Oxenham et al.

It is certified that error appears in the above-identified patent and that said Letters Patent is hereby corrected as shown below:

In the Claims

In Claim 1, at Column 14, Line 14: Please add --a-- before "...one or more user..."

In Claim 1, at Column 14, Line 16: Please delete "the" and add --a-- before "...user device,"

In Claim 1, at Column 14, Line 36: Please add --and-- after "... first user,..."

In Claim 1, at Column 14, Line 39: Please add a --,-- as follows --the user device,--

In Claim 1, at Column 14, Line 48: Please add --one or more-- after "...least one of the..."

In Claim 2, at Column 14, Line 57: Please delete "the" and add --a-- after "...as a part of..."

In Claim 3, at Column 14, Line 62: Please add a --,-- after "..second user"; and after "...first user"

In Claim 7, at Column 15, Line 25: Please delete "the" and add --a-- before "...user device,..."

In Claim 7, at Column 15, Line 28: Please add --a-- before "...one or more available seats,..."

In Claim 7, at Column 15, Line 37: Please delete "presenting" and add --present-- after "... automatically..."

In Claim 7, at Column 15, Line 41: Please delete "determining" and add --determine-- before "...a location of..."

In Claim 7, at Column 15, Line 42: Please delete "presenting" and add --present-- before "... a second visual..."

In Claim 7, at Column 15, Line 45: Please add --and-- before "...wherein the selectable features Signed and Sealed this
Seventh Day of June, 2022

Katherine Kelly Vidal
*Director of the United States Patent and Trademark Office*

CERTIFICATE OF CORRECTION (continued)
U.S. Pat. No. 11,068,804 B2 belong..."

In Claim 7, at Column 15, Line 48: Please delete "receiving" and add --receive-- before "...a user selection..."

In Claim 7, at Column 15, Line 52: Please delete "presenting" and add --present-- before "...the first user..."

In Claim 7, at Column 15, Line 57: Please add --one or more-- before "...determined user preferences."

In Claim 9, at Column 15, Line 66: Please add a --,-- after "...a second user..."; and after "...the first user..."

In Claim 9, at Column 16, Line 3: Please add --user-- between "one or more" and "...prefer-..."

In Claim 13, at Column 16, Line 27: Please add --a-- before "...one or more user preferences of..."

In Claim 13, at Column 16, Line 29: Please delete "the" and add --a-- before "...user device,..."

In Claim 13, at Column 16, Line 32: Please add --a-- before "...one or more available seats,..."

In Claim 13, at Column 16, Line 40: Please delete "presenting" and add --present-- after "automatically..."

In Claim 13, at Column 16, Line 44: Please delete "determining" and add --determine-- before "...a location..."

In Claim 13, at Column 16, Line 45: Please delete "presenting" and add --present-- before "...a second..."

In Claim 13, at Column 16, Line 48: Please add --and-- before "...wherein the selectable features..."

In Claim 13, at Column 16, Line 51: Please delete "receiving" and add --receive,-- before "...a user selection..."

In Claim 13, at Column 16, Line 51: Please add a --,-- after "...the user device..."

In Claim 13, at Column 16, Line 54: Please delete "presenting" and add --present-- before "...the first user..."

In Claim 13, at Column 16, Line 58: Please add --one or more-- before "...determined user preferences."

In Claim 15, at Column 17, Line 3: Please add a --,-- after "..a second user..."; and "...the first user..."

CERTIFICATE OF CORRECTION (continued)
U.S. Pat. No. 11,068,804 B2

In Claim 15, at Column 17, Line 7: Please add --user-- before "...preferences comprise..."